Nov. 10, 1959    E. WILDHABER    2,911,805
UNIVERSAL JOINT
Filed March 5, 1957    2 Sheets-Sheet 1
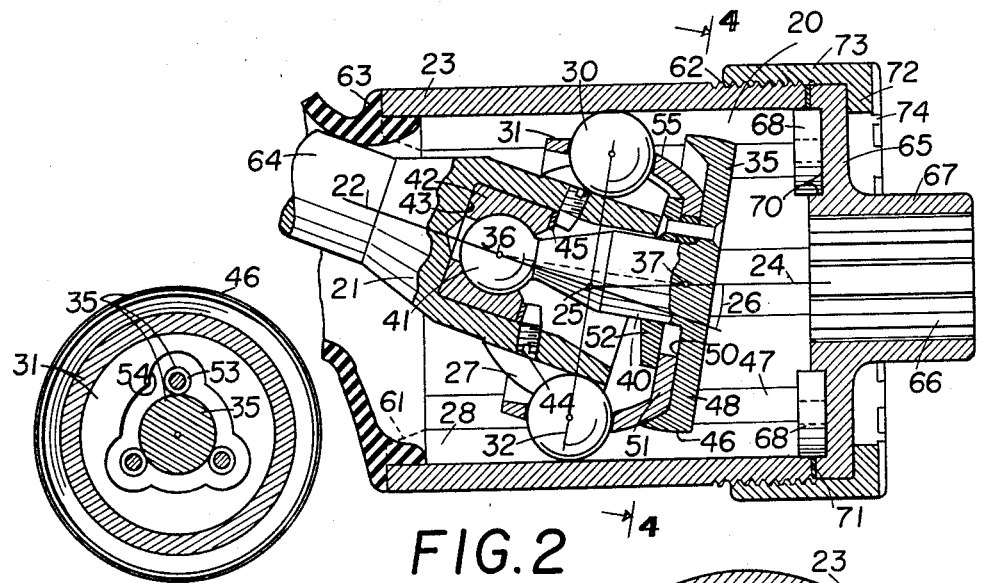
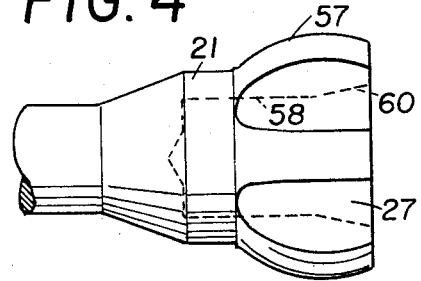
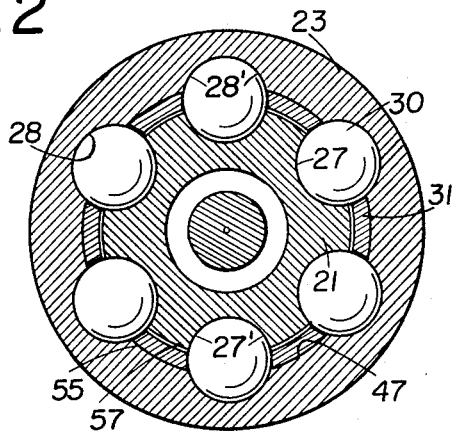
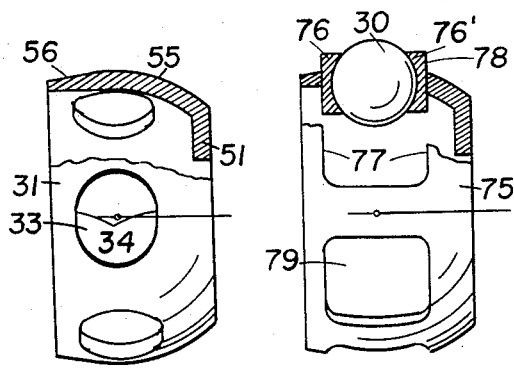
INVENTOR:
Ernest Wildhaber Nov. 10, 1959    E. WILDHABER    2,911,805
UNIVERSAL JOINT
Filed March 5, 1957    2 Sheets-Sheet 2

INVENTOR:
Ernest Wildhaber

United States Patent Office 2,911,805
Patented Nov. 10, 1959

2,911,805

UNIVERSAL JOINT

Ernest Wildhaber, Brighton, N.Y.

Application March 5, 1957, Serial No. 644,140

16 Claims. (Cl. 64—21)

The present invention relates to universal joints for transmitting torque between two members whose axes intersect at an angle which may vary in operation, and particularly to universal joints of the constant velocity type, wherein the said two members contain ways engaged by rotatable parts, such as balls or rollers or even sliding blocks, and wherein the centers of said rotatable parts are maintained in the bisector plane of the axes of said two members.

One object of the present invention is to provide simple constant-velocity universal joint that is based on exact principles and yet is of low cost.

An exact joint, as the one aimed at, is capable of transmitting true uniform motion and has a further advantage when more than two rolling elements are provided. It lets all the rolling elements share the load equally, or more nearly equally than where the motion is not truly uniform. With a motion departing even slightly from true uniform motion, depending on the turning position, the load is not equally distributed, as the different rolling elements have different turning positions and tend to transmit different motions. The elements tending to produce the most advanced turning positions on the driven member thus will carry most of the load. Other rolling elements may be out of contact entirely, depending on the degree of departure from true uniform motion.

A further object is to provide an improved constant-velocity universal joint that permits a substantial displacement along the axis of one of the two members, having ways parallel to the axes of the respective members, and a universal joint such as may be used in a Hotchkiss drive adjacent the rear axle of cars or trucks.

A universal joint, in which each of the two members connected by the joint has ways parallel to its axis, is potentially of the simplest possible type, even though it requires a control element to maintain the centers of the balls or rollers in the bisector plane of the axes of the two members. The control element preferably has an axis intersecting the axes of the two members at two spaced points. The said axes themselves have a further intersection point.

It is not possible to keep two of these three points fixed to one of said two members, as the distance between said points changes somewhat as the shaft angle of the joint changes.

Many known designs maintain said further intersection point fixed with respect to one or both of said two members. The rolling means then have to be held laterally in alignment with said intersection point. In some cases this requires a costly number of precision fits. A further aim is to reduce the number of fits.

In other cases, especially where a single roller axis is employed, this lateral alignment of the rollers requires extra space, space available only by increasing the diameter of the joint, as the central space is also occupied by the control element. A further object of the invention is to keep the diameter of the universal joint down by letting the said intersection point float, and not having it fixed to one or both of said two members. Instead one of said spaced points is fixed on the member on whose axis it lies and on the control element. The specification will show how the axes of said two members may be constrained to intersect at the level of the rolling means, at a changing distance from said fixed point.

A further object is to devise a universal joint comprising an inner member and an outer member both having ways parallel to their respective axes, where the outer member encloses the ways of the inner member and the rolling means, and where the control element is positively attached as if by a ball joint to the inner member, to control the lateral position of the rolling means. A related aim is to provide a universal joint where in addition the other of said two spaced points is fixed with respect to the control element and axially movable with respect to said outer member. A further aim is to provide an improvement of an embodiment described in my pending patent application entitled "Universal Joint," filed February 13, 1957, Serial No. 639,942.

Other objects will appear in the course of the specification and in the recital of the appended claims. These objects may be attained singly or in any combination.

In the drawings:

Fig. 1 is a diagram of one of the problems incurred and solved by the present invention.

Fig. 2 is an axial section of one form of universal joint constructed according to the present invention, showing the joint at the maximum angularity for which it is designed.

Fig. 3 is a cross-section corresponding to Fig. 2, showing the joint in alignment.

Fig. 4 is a section of the control means, taken along line 4—4 of Fig. 2, with the joint in alignment.

Fig. 5 is a side view of the inner member, shown in section in Figures 2 and 3.

Fig. 6 is partly an axial section, partly a side view of the cage member of the embodiment of Figures 2 to 5.

Fig. 7 is a similar axial section and side view, illustrating a modification of the cage member.

Fig. 8 is an axial section, and Fig. 9 is a corresponding cross-section of this modified universal joint.

Fig. 10 is a section taken through the control element along line 36—37 of Fig. 8.

Fig. 11 is a side view of the inner member shown in section in Figures 8 and 9.

Fig. 12 is an axial axial view and Fig. 13 is a corresponding side view of a centering part of the universal joint shown in Figures 8 to 11.

Figure 8:
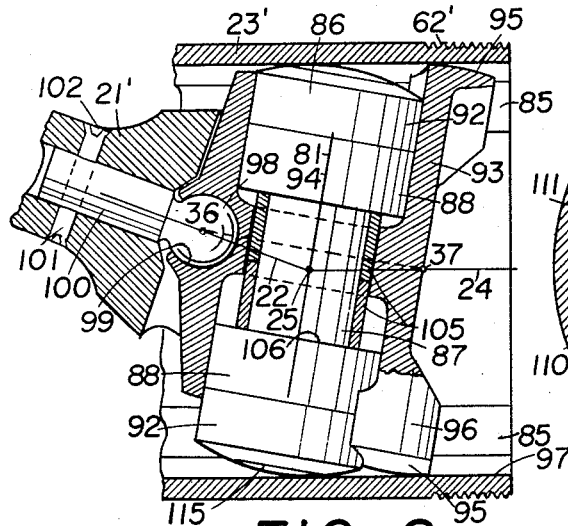
Figures 8 to 13 illustrate a modified embodiment of the invention.

The universal joint 20 (Figures 1 to 6) serves to transmit torque between an inner member 21 with axis 22 and an outer member 23 with axis 24. The axes 22 and 24 intersect at 25 and include an angle 26 with each other, which may vary in operation. The members 21 and 23 contain ways 27, 28 that are parallel to their respective axes 22 and 24. The ways are engaged by a plurality of balls 30. A cage member 31 maintains the balls in a plane 32. Member 31 contains elongated slots 33 (Fig. 6) that have plane side-surface portions 34. These have direct contact with the balls.

As known, constant velocity is transmitted when the plane (32) of the ball centers coincides with the bisector plane. The latter passes through intersection point 25 and bisects the supplement of angle 26. This supplement, or 180 deg.-angle 26, is the angle between opposite branches of the axes 22 and 24. The cage member 31 is tilted to the required angle by a rotatable control element 35, whose axis 36—37 is constrained to intersect the axes 22 and 24 at points 36, 37 respectively. Points 36, 37 lie on opposite sides of intersection point 25, at equal distances therefrom and from plane 32. Because of this equality, the axis 36—37 of the control element 35 is equally inclined to both axes 22, 24. The inclination angle 38 (Fig. 1) is exactly one half of angle 26 (Fig. 2).

Control element 35 has a shaft-like portion 40 with ball end 41 centered at 36. The ball end engages a socket portion 42 which may be moulded around it or rolled onto it, and which is preferably made of a known material requiring little or no lubrication. Socket portion 42 is axially fixed to and rigid with inner member 21. It is pressed against a shoulder 43 through a disk 45 by a pair of screws 44 threading into member 21. Disk 45 is springy, and exerts continuous pressure against the tapered ends of the screws 44, thereby securing them against looseness.

At the end opposite to the ball end 41 the control element 35 contains a convex spherical ring-shaped surface 46 centered at 37. It is adapted to engage the cylindrical inside surface 47 of the outer member 23, with axis 24. The center 37 is thus constrained to remain on axis 24, and is free to move along said axis. Spherical surface 46 is at the periphery of a flange portion 48 which has a plane side 50 perpendicular to axis 36—37. This side contacts a matching plane side provided on a flange portion 51 of cage member 31. The flanges 51, 48 are kept in engagement by a disk 52 riveted to flange 48 through spacer rings 53. Accordingly the cage member 31 and the control element 35 are movable relatively to each other in a plane perpendicular to axis 36—37, in a plane like plane 32. Recesses 54 (Fig. 4) are provided in flange 51, to clear the spacer rings 53.

The cage member 31 (Fig. 6) has a spherical outside surface 55 and preferably a conical end 56. Spherical portion 55 engages the cylindrical inside surface 47 of the outer member 23, and keeps the cage member in the proper radial position. No high degree of fit is here required.

Centering of members 21 and 23 is not through the cage member. The spherical outside surface 57 of member 21 does not fully contact the inside surface of the cage member. No guiding pressure is transmitted. Such contact could provide only an approximate solution, because the distance 36—25 changes somewhat as the shaft angle 26 changes. Thus distance 36—25, Fig. 1, is larger than the corresponding distance 36—25' at zero angle.

A costly number of fits are avoided by fixing point 36 to member 21 and leaving point 25 free to float axially. The control element 35, and thereby the control means comprising element 35 and cage member 31, are positively attached to inner member 21 by ball joint 41, 42. They thus control and set the lateral position of the balls 30, that is the lateral position of plane 32.

The axes 22, 24 are constrained to intersect at 25 in a very simple manner, by the working contact of the balls themselves. This requires a number of balls larger than two, enough of them for their centers to define a plane. In other words the balls themselves constrain the axes 22, 24 to intersect in the plane 32 of the ball centers, at a varying distance from point 36. The function of the control means is to maintain the balls in a plane and to keep this plane at the right inclination, equally inclined to both axes 22, 24. This plane then coincides with the bisector plane.

The structural advantage attained with the invention is apparent at once. There is no need to center the inner member in the outer member through the cage, no need to center the cage on the inner member and to hold it axially in a fixed position thereon, no need therefore for well fitting external and internal spherical surfaces on the inner member and cage respectively, no need for a split cage member to facilitate assembly, no need for a sliding connection between the ball end 41 and inner member 21.

And yet complete accuracy is attained. The centering through the balls or rolling means moreover is preferable to centering through other portions, because it exists anyhow, and may fight centering through other portions unless perfect accuracy is achieved.

It should also be noted that my joint does not have to rely on elastic deformation. It provides full accuracy with rigid parts.

I have shown a single control element 35 operating on both sides of the rollers through the cage member. It is conceivable to provide separate control elements for opposite sides. But then they should preferably have the same motions though separate.

Fig. 5 shows the inner member 21 separately. Its spherical outside surface 57 has a position and diameter so as not to interfere with the inside surface of the cage member 31. Surface 57 is gashed by the straight ways 27. The ways have circular arcuate profiles (Fig. 3) whose side portions 27' match the circular ball profile completely or nearly. The central bore 58 is preferably flared at the outer end 60.

The straight ways 28 of the outer member 23 have circular arcuate profiles 28' similar to profiles 27'. Member 23 may be flared at one end, at 61. Except for that and for a thread 62 provided at the opposite end, member 23 has a constant cross-section from end to end. This facilitates manufacture.

A flexible seal 63 is bonded or otherwise attached to member 23 in any suitable known way. Its opposite end (not shown) is clamped or attached to a shaft portion rigid with shaft portion 64 of member 21.

Outer member 23 transmits torque to a flange member 65 that contains splines 66 provided internally in its hub 67. These splines are for connection to a further shaft portion, not shown. Flange member 65 is rigidly secured to outer member 23 by means of two or more circular disks 68 matching the ends of the ways 28. The disks 68 are pressed into circular recesses 70 provided on the face of the flange member 65. They may be further secured in known manner to said recesses. They act as keys to positively transmit torque between members 23 and 65. A gasket 71 is interposed between the outer end of flange member 65 and member 23. It is kept under pressure by a nut 73 of sleeve form which engages thread 62. Its shoulder 72 engages the flange of member 65. Teeth 74 are provided on nut 73 for tightening.

The modified cage member 75 shown in Fig. 7 acts on the balls 30 through slippers 76, 76' which match or nearly match the spherical ball surface. The slippers 76, 76' of opposite sides of a ball may be separate; or they may be connected if desired. When connected longer openings 79 should be provided in the cage member 75. The outer plane sides 78 of the slippers engage the plane sides 77 of the openings 79. In this way surface contact may be achieved.

*Single roller axis*

An embodiment with single roller axis 81 will now be described with Figures 8 to 13. In this case the working contact of the rollers does not effect full centering. Additional means, associated with the rolling means, are here provided to fully constrain the axes 22, 24 of the two members 21', 23' to intersect at point 25 on the roller axis 81.

The inner member 21' has a forked end 80 (Fig. 11) with a slot 82 whose plane sides 83 constitute a pair of ways 84. The side surfaces of these ways are parallel to axis 22 of member 21'. There are no bottom surfaces on these ways, as slot 82 extends right through member 21'. The outer member 23' similarly contains a pair of plane-sided ways 85 that are parallel to its axis 24. A thread 62' serves for connection with a further member.

A rolling part 86 comprises a rod or pin 87 and a pair of inner rollers 88 rigid with rod 87. The rollers 88 are mounted on rod 87 with a press fit. They are further secured against outward displacement by a ring 89 rolled into a groove 90 of rod 87. A snap ring may be used in place of ring 89, if desired. Also one of the rollers 88 may be formed integral with rod 87.

Rotatably mounted on the outer parts of rod 87, as by needle bearings 91, are a pair of rollers 92 adapted to engage the ways 85 of outer member 23'. The rollers 88 and 92 contain a common axis 81. A rotatable control element 93 engages opposite sides of the rollers with parallel plane portions 34'. It straddles the rollers and controls their lateral position, as well as their inclination. The axis 36—37 of the control element 93 is constrained to intersect the axes 22, 24 at points 36, 37 at opposite sides of intersection point 25, and at equal distances from the central plane 94 of element 93.

The constraint at point 37 is through the spherical outside ends 95 of element 93 and through the cylindrical side-surfaces 96 that engage the plane sides of the ways 85. Ends 95 engage the cylindrical bottom surfaces 97 of ways 85. The surfaces 96 and ways 85 in effect constitute a Cardan-type universal joint with center 37, a joint which controls the turning position of the control element, but transmits little torque. Thus point 37 of the control element remains on axis 24, and is slidable thereon.

The constraint at point 36 is through a ball end 98 and socket 99 rigid with the control element 93. The latter may be of a material that can be moulded around the ball end 98 or rolled onto it. Ball end 98 is part of a rod 100 that is rigidly secured to member 21' by means of a pin 101. To secure the pin, it may be provided with slit ends 102 which are bent out somewhat after mounting the pin. Further description of this control element is found in my aforesaid patent application.

It is seen that the roller axis 81 is kept in the central plane 94 of the control element, at a constant distance from fixed point 36. It thus should intersect axis 22 at a distance from point 36 which changes somewhat as the angularity of the universal joint changes.

Figure 13:
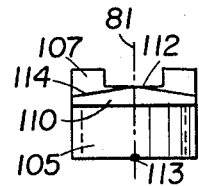

This is accomplished, and axis 24 of member 23' is constrained to intersect axis 22 at point 25, in the central plane 94, partly through the working contact of the rollers, and further by means effecting alignment in the direction of the roller axis 81. These means have a constant lateral position with respect to the roller axis; that is they move laterally with the rollers. The rollers 88 of rolling part 86 are centered on the inner member 21' in the direction of their axis 81 by a pair of parts 105 coaxial with rod 87 and rotatable about it. The two parts 105 abut each other and lie between the pair of rollers 88 that are rigid with rod 87, contacting the adjacent sides 106 of said rollers. They contain portions 107 whose plane sides 108 are adapted to engage the plane sides 83 of the ways 84. They contain further projections 110 that engage inside planes 111 provided on inner member 21' and contact with portions 112 that lie on a cylindrical surface with axis 113. The latter is at right angles to the roller axis 81. The cylindrical portions 112 extend only as far as required for contact. They are joined by sloped plane side portions 114 tangent thereto (Fig. 13).

In operation the roller axis 81 swings back and forth in the central plane of the ways 84, and the parts 105 turn on the roller axis so as to keep the plane sides 108 in contact with the ways. Axis 113 thereby remains perpendicular to the ways, and the cylindrical portions 112 remain in contact with the inside planes 111. In this way the rod 87 and its rollers are maintained in a constant axial position with respect to the inner member 21'.

A similar axial alignment with the outer member 23' is achieved by the spherical ends 115 of rod 87, contacting the cylindrical inside surface 97 of the ways 85. Surface 97 extends about axis 24 of the outer member. It is coaxial therewith. Centering in a direction at right angles to roller axis 81 is effected by the working contact of the rollers. In this way complete centering through the rollers is effected, with the help of parts 105. And the axes 22, 24 are constrained to intersect at 25 in the central plane 94 of the control element 93. This plane then coincides with the bisector plane, as required.

It should be noted that the inner member 21' has no direct guiding contact with the outer member 23'. It should further be noted that member 21' contains plane sides 111 adjacent its ways 84, rather than only a cylindrical inside surface, and that the diameter of its outside surface 120, in a direction at right angles to the ways 84, is larger than the diameter of a sphere inscribed to the outer member 23' and touching the inside edges 121 of the ways 85. Thus more room is gained for the control element 93 whose ring-shaped connecting portion 122 (Fig. 10) surrounds rod 87 and parts 105 with sufficient side clearance.

In assembly rod 87 is placed in the hole 123 of the control element; the parts 105 are assembled on rod 87 from opposite sides, and the inner rollers 88 are pressed onto rod 87 in a fixture and secured with rings 89. Later on the outer rollers 92 are applied.

While I have shown a ball-end and socket for attaching the control element to the inner member (21' or 21), I may also use a mechanical equivalent to the same effect. Also in some applications the socket of a ball-end and socket connection may occupy only one half of the full sphere surface, and the ball-end is then maintained in engagement with the socket at all times by spring pressure, as is well known in ball and socket design.

Figure 14:
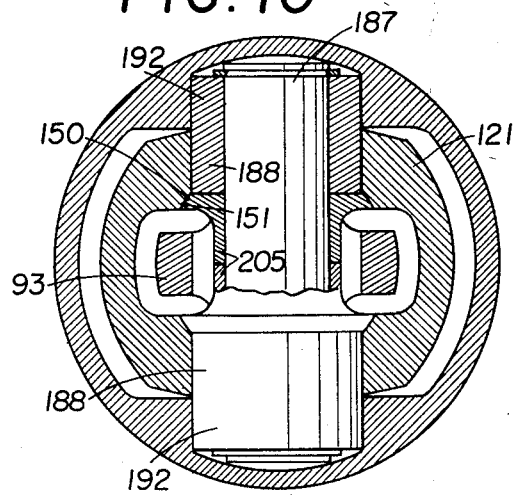
Fig. 14 is a cross-section illustrating a slightly modified embodiment of the invention.

The modification illustrated in Fig. 14 employs the same control element 93, but differs from the just described embodiment in the parts 205 that keep rod 187 axially in alignment with the inner member. It also differs therefrom by having the outer rollers 192 and inner rollers 188 all rigid with each other and with rod 187, to reduce cost. While more sliding is incurred thereby, the joint transmits also true uniform motion.

The parts 205 contain each a convex spherical surface 150 centered on the roller axis at its intersection with the axis of the inner member 121. The spherical surfaces 150 engage portions 151 of an inside cylindrical surface coaxial with inner member 121 and part thereof. The parts 205 are preferably rotatable about rod 187 to adjust their turning position to the position of the control element 93.

Figure 9:
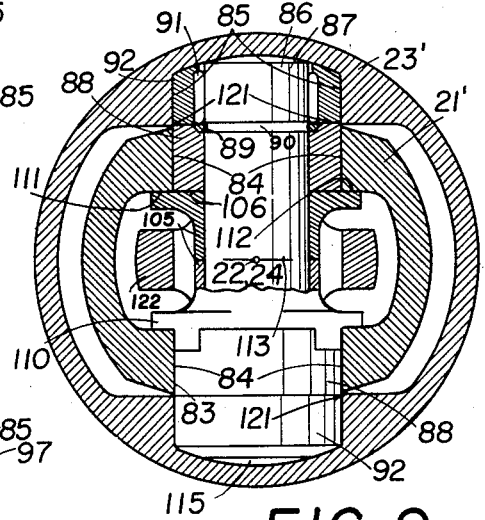
Figure 10:
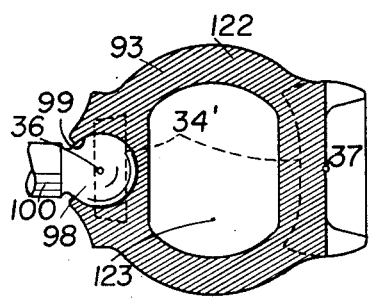
Figures 11, 12:
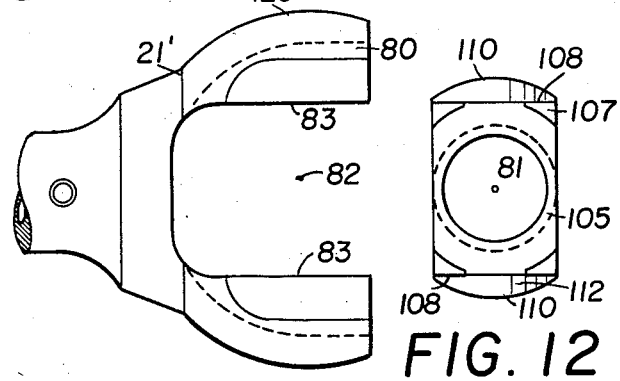

Of course the parts 205 could also be used with the rollers 88, 92 of Figures 8 and 9. And parts 105 could also be used with the rolling means of Fig. 14.

While at present I prefer balls or rollers to transmit torque between the ways of the two members, it is also possible to employ other intermediate rotatable means in their place, such as sliding blocks, as is readily understood.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

I claim:

1. A universal joint for transmitting torque comprising two members whose axes intersect at an angle which may vary in operation, each of said members having a plurality of ways whose sides, at least, extend in the direction of the axis of the respective member, intermediate rotatable means engaging said ways to operatively connect said members, rotatable control means adapted to maintain the centers of said intermediate means in a plane, said control means having guide surfaces extending about an axis for transmitting guiding pressure to said intermediate rotatable means, means on said members engaging said control means for constraining said control means to cause said axis to intersect the axes of said two members at two points on opposite sides of said plane, to incline said plane equally to the axes of the two members, means connecting said control means to one of said members, at least, to hold one of said points fixed on the axis of one of said members and fixed relative to said control means.

2. A universal joint according to claim 1, wherein said two members are an inner member, and an outer member enclosing the ways of said inner member, and wherein said control means contain spherical surface portions centered at said two points at a fixed distance from one another, and wherein means is provided for attaching one of said spherical surface portions to said inner member, and wherein the other of said spherical surface portions engages with said outer member.

3. A universal joint according to claim 2, wherein said intermediate rotatable means are balls numbering more than two, said balls by their sufficient number constraining the axes of said two members to intersect in the plane of the balls without direct guiding contact between said members.

4. A universal joint for transmitting torque comprising two members whose axes intersect at an angle which may vary in operation, each of said members having a plurality of ways whose sides, at least, extend in the direction of the axis of the respective member, rolling means engaging said ways to operatively connect said members, one of said members being an inner member, the other member being an outer member enclosing the ways of said inner member, rotatable control means for maintaining the centers of said rolling means in a plane, said control means having plane-sided guide surfaces parallel to said plane and means for transmitting guiding pressure from said guide surface to said rolling means, means on said members engaging said control means for constraining the axis of said rotatable control means to intersect the axes of said two members at two points at opposite sides of the intersection point of the last-named axes and at equal distances from said plane, means connecting said control means to one of said members, at least, to hold one of said two points axially fixed on the axis of said inner member and fixed relative to said control means.

5. A universal joint according to claim 4, wherein said rolling means are balls numbering more than two, and wherein said control means comprise a rotary control element and a cage member for transmitting guiding pressure to said balls, said cage member being movable relatively to said control element in a plane perpendicular to the axis of said control element.

6. A universal joint according to claim 5 wherein said cage member has a flange on one side engaging plane guide surfaces provided on said control element, said guide surfaces being perpendicular to the axis of said control element.

7. A universal joint for transmitting torque comprising an inner member and an outer member whose axes intersect at an angle which may vary in operation, a plurality of balls numbering more than two, ways provided on both of said members for engagement with said balls, said ways extending parallel to the axes of the respective members, said outer member enclosing said balls and the ways of the inner member, a cage member provided with openings straddling said balls and adapted to retain said balls in a plane, said inner member having a central hole extending axially therein, a rotatable control element in contact with said cage member for motion relative thereto, said control element having a stem projecting into said hole beyond said plane, and means for constraining the axis of said control element to intersect the axes of said two members on opposite sides of said plane, one of the intersection points being adjacent the projecting end of said stem.

8. A universal joint according to claim 4, wherein the connection between the inner member and the control means is effected by a ball joint whose ball portion is rigid with said inner member.

9. A universal joint for transmitting torque comprising an inner member and an outer member whose axes intersect at an angle which may vary in operation, each of said members containing a pair of diametrically opposite ways whose sides are parallel to the axes of the respective members, coaxial rotatable means engaging the ways of both members to transmit torque between them, said outer member enclosing the ways of said inner member, a rotatable control element for maintaining the axis of said rotatable means in a plane equally inclined to the axes of said two members, said control element having an axis perpendicular to said plane and being pivotally attached to said inner member at a pivot point offset from said plane and lying on the axis of said inner member, and means associated with said rotatable means for centering said two members axially of said rotatable means.

10. A universal joint according to claim 2, wherein said control means are attached by a ball joint to said inner member, said ball joint being adapted to positively transmit load in any direction.

11. In two members, each of which is provided with ways, a universal joint, a rolling part having working surfaces adapted to engage the ways of the two members, centering portions coaxial with said rolling part for further engagement with one of said two members, said centering portions being adapted to move together but being split for assembly, and a one-piece control element having opposite portions straddling said working surfaces and adapted to transmit guiding pressure thereto, said opposite portions being connected by a ring-shaped central portion having an opening through which said rolling part extends, said opening being small enough to prevent said centering portions from passing through it completely.

12. A universal joint for transmitting torque, comprising an inner member and an outer member whose axes intersect at an angle which may vary in operation, each of said members containing a pair of diametrically opposite ways whose sides are parallel to the axes of the respective members, coaxial rotatable means engaging the ways of both members to transmit torque between them, said outer member enclosing the ways of said inner member, a rotatable control element for maintaining the axis of said rotatable means in a plane equally inclined to the axes of said two members, said control element having an axis perpendicular to said plane and being pivotally attached to said inner member at a point offset from said plane and lying on the axis of said inner member, and means associated with said rotatable means for centering said two members axially of said rotatable means, said centering means including parts movable about the axis of said rotatable means and bearing against a pair of surfaces provided on said inner member, said surfaces being parallel to the axis of said inner member.

13. A universal joint according to claim 12, wherein said inner member has plane surfaces adjacent its ways, wherein said parts of the centering means contain cylindrical portions adapted to engage said plane surfaces, and wherein the last-named parts contain further portions adapted to engage the sides of said ways.

14. A universal joint for transmitting torque, comprising an inner member and an outer member whose axes intersect at an angle which may vary in operation, each of said members containing a pair of diametrically opposite ways whose sides are parallel to the axes of the respective members, coaxial rotatable means engaging the ways of both members to transmit torque between them, said outer member enclosing the ways of said inner member, a rotatable control element for maintaining the axis of said rotatable means in a plane equally inclined to the axes of said two members, said control element having an axis perpendicular to said plane and being pivotally attached to said inner member at a point offset from said plane and lying on the axis of said inner member, and means associated with said rotatable means for centering said two members axially of said rotatable means, said outer member having cylindrical portions coaxial therewith, and said control element having portions lying in a convex spherical surface and engaging said cylindrical portions.

15. A universal joint for transmitting torque, comprising an inner member and an outer member whose axes intersect at an angle which may vary in operation, each of said members containing a pair of diametrically opposite ways whose sides are parallel to the axes of the respective members, coaxial rotatable means engaging the ways of both members to transmit torque between them, said outer member enclosing the ways of said inner member, a rotatable control element for maintaining the axis of said rotatable means in a plane equally inclined to the axes of said two members, said control element having an axis perpendicular to said plane and being pivotally attached to said inner member at a point offset from said plane and lying on the axis of said inner member, and means associated with said rotatable means for centering said two members axially of said rotatable means, said inner member having a slotted head containing its ways, the diameter of said head in a direction at right angles to its ways being larger than the diameter of a sphere inscribed to the outer member concentric therewith and touching the inner ends of the ways of said outer member.

16. A universal joint for transmitting torque, comprising an inner member and an outer member whose axes intersect at an angle which may vary in operation, each of said members containing a pair of diametrically opposite ways whose sides are parallel to the axes of the respective members, coaxial rollers engaging the ways of both members to transmit torque between them, said outer member enclosing the ways of said inner member, a rotatable control element for maintaining the axis of said rollers in a plane equally inclined to the axes of said two members, said control element having an axis perpendicular to said plane and being pivotally attached to said inner member at a point offset from said plane and lying on the axis of said inner member, said control element containing a spherical portion engaging said outer member and centered on the axis of the control element at a point spaced from the point of attachment of said control element to said inner member, said two points being on opposite sides of said plane, and means associated with said rollers for centering said two members axially of said rollers.

References Cited in the file of this patent
UNITED STATES PATENTS

| | | |
|---|---|---|
| 2,010,899 | Rzeppa | Aug. 13, 1935 |
| 2,239,675 | Hanft et al. | Apr. 29, 1941 |
| 2,352,776 | Dodge | July 4, 1944 |
| 2,427,237 | Suczek | Sept. 9, 1947 |
| 2,532,433 | Wingquist | Dec. 5, 1950 |
| 2,551,779 | Wingquist | May 8, 1951 |